(12) United States Patent
Cadambi et al.

(10) Patent No.: US 7,019,674 B2
(45) Date of Patent: Mar. 28, 2006

(54) CONTENT-BASED INFORMATION RETRIEVAL ARCHITECTURE

(75) Inventors: Srihari Cadambi, Cherry Hill, NJ (US); Joseph Kilian, West Windsor, NJ (US); Pranav Ashar, Belle Meade, NJ (US); Srimat T. Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 10/909,907

(22) Filed: Aug. 2, 2004

(65) Prior Publication Data

US 2005/0174272 A1    Aug. 11, 2005

Related U.S. Application Data

(60) Provisional application No. 60/541,983, filed on Feb. 5, 2004.

(51) Int. Cl.
*H03M 7/00* (2006.01)
(52) U.S. Cl. .......................... 341/106; 341/50; 341/51
(58) Field of Classification Search ................ 341/106, 341/51, 63, 60, 50; 380/286
See application file for complete search history.

(56) References Cited

U.S. PATENT DOCUMENTS

| | | | | |
|---|---|---|---|---|
| 5,371,499 A | * | 12/1994 | Graybill et al. | 341/51 |
| 6,087,967 A | * | 7/2000 | Budnik et al. | 341/63 |
| 6,160,891 A | * | 12/2000 | Al-Salqan | 380/286 |
| 6,236,341 B1 | * | 5/2001 | Dorward et al. | 341/60 |
| 6,611,213 B1 | * | 8/2003 | Bentley et al. | 341/51 |
| 6,624,762 B1 | * | 9/2003 | End, III | 341/51 |
| 2002/0143755 A1 | * | 10/2002 | Wynblatt et al. | |
| 2003/0198224 A1 | * | 10/2003 | Lee et al. | |
| 2005/0187898 A1 | * | 8/2005 | Chazelle et al. | |

OTHER PUBLICATIONS

Cormen, T.H. et al., "Introduction to Algorithms" Second Edition—Chapter 11, Copyright 2001 by The Massachusetts Institute of Technology, month unknown.
Pagh, R. et al., "Cuckoo Hashing", Journal of Algorithms, 51, 2004, month unknown.
Bloom, B.H., "Space/Time Trade-Offs in Hash Coding in Allowable Errors", Communications of the ACM, vol. 13, No. 7, Jul. 1970.

(Continued)

*Primary Examiner*—Jean Bruner Jeanglaude
(74) *Attorney, Agent, or Firm*—Benjamin S. Lee

(57) ABSTRACT

A content-based information retrieval architecture is herein disclosed that can achieve correct and predictable high speed lookups while taking advantage of inexpensive conventional memory components. A content-based information retrieval architecture is herein disclosed that can achieve high speed lookups with a constant query time while taking advantage of inexpensive conventional memory components. In accordance with an embodiment of the invention, the architecture comprise a hashing module, a first table of encoded values, a second table of lookup values, and a third table of associated input values. The input value is hashed a number of times to generate a plurality of hashed values, the hashed values corresponding to locations of encoded values in the first table. The encoded values obtained from an input value encode an output value such that the output value cannot be recovered from any single encoded value.

42 Claims, 12 Drawing Sheets

OTHER PUBLICATIONS

Brodnik, A. et al., "Membership in Constant Time and Almost-Minimum Space", SIAM J. Comput., vol. 28, No. 5, 1999 Society for Industrial and Applied Mathematics, no month.

Buhrman, H. et al., "Are Bitvectors Optimal?", Proc. 32nd STOC, 2000, month unknown.

Capalbo, M. et al., "Randomness Conductors and Constant-Degree Lossless Expanders", Proc. 34nd STOC, 2002, month unknown.

Cohen, S. et al., "Spectral Bloom Filters", SIGMOD Jun. 9-12, 2003.

Fan, L., et al., "Summary Cache: A Scalable Wide-Area Web Cache Sharing Protocol", IEEE/ACM Transaction Networking, vol. 8, No. 3, Jun. 2000.

Fredman, M.L. et al., "Storing a Sparse Table with O(1) Worse Case Access", Journal of the Association for Computing Machinery, vol. 31, No. 3, Jul. 1984.

Kleitman, D.J. et al., "Families of k-Independent Sets", Discrete Mathematics 6, 1973, month unknown.

Luby, M., "LT Codes", Proceedings of the 43rd Annual IEEE Symposium on Foundations of Computer Science, 2002, month unknown.

Mitzenmacher, M., "Compressed Bloom Filters", IEEE/ACM Transactions on Networking, vol. 10, No. 5, Oct. 2002.

Razborov, A.A., "Applications of Matrix Methods to the Theory of Lower Bounds in Computational Complexity", Combinatorica 10(1), 1990, month unknown.

Rhea, S.C. et al., "Probabilistic Location and Routing", IEEE Infocome 2002, month unknown.

Sipser, M. et al., "Expander Codes", IEEE Transactions on Information Theory, vol. 42, No. 6, Nov. 1996.

Kobayashi, M. et al., "A Longest Prefix Match Search Engine for Multi-Gigabit IP Processing", IEEE, 2000, month unknown.

Waldvogel, M. et al., "Scalable High Speed IP Routing Lookups", SIGCOMM, 1997, month unknown.

Taylor, D.E. et al., "Scalable IP Lookup for Programmable Routers", IEEE 2002, month unknown.

Dharmapurikar, S. et al., "Longest Prefix Matching Using Bloom Filters", SIGCOMM 2003, month unknown.

Mansour, M. et al., "FPGA-Based Internet Protocol Version 6 Router", no date.

Lampson, B. et al., "IP Lookups Using Multiway and Multicolumn Search", IEEE/ACM Transactions on Networking, vol. 7, No. 3, Jun. 1999.

Prakash, A. et al., "A Middle Ground Between CAMs and DAGs for High-Speed Packet Classification", Proceedings of the 10th Symposium on High Performance Interconnects Hot Interconnects 2002, no month.

Liu, H., "Reducing Routing Table Size Using Ternary-Cam", Hot Interconnects 9, 2001, month unknown.

Broder, A. et al., "A Survey: Network Applications of Bloom Filters", Proceedings of the 40th Annual Allerton Conference, Oct. 2002.

\* cited by examiner

CONTENT-BASED INFORMATION RETRIEVAL ARCHITECTURE

This Utility patent application is a Non-Provisional of and claims the benefit of U.S. Provisional Patent Application Ser. No. 60/541,983 entitled "INEXPENSIVE AND FAST CONTENT ADDRESSABLE MEMORY" filed on Feb. 5, 2004, the contents of which are incorporated by reference herein.

BACKGROUND OF THE INVENTION

The present invention relates to architectures for fast information retrieval.

Content addressable memories (CAMs) are devices that are queried using data in contrast to conventional memories that are queried using addresses. CAMs search through their contents to check if the data exists, and if so, provide information associated with the data. Such memories find applications in Internet routers, processor caches, databases, and other situations where fast lookups are required. Most commercial routers employ CAM devices called Ternary-CAMs (TCAMs) which are specialized memory devices that check if a query matches every entry in parallel. TCAMs are more expensive that conventional SRAM or DRAM. TCAMs are built using about 16 transistors per bit—therefore being about two to three times less dense than SRAMs which have about 6 transistors per bit. TCAMs have long "match lines" that incur considerable capacitance, thereby causing their power capacitance to be high and, more importantly, their speed to be relatively slow. TCAMs, however, continue to be an attractive proposition for router manufacturers because current commercial technology lacks a viable technique to use conventional SRAM to efficiently perform the lookup.

There are a variety of known data structures that effectively behave like content addressable memory, each with their own relative advantages and disadvantages. For example, trie-based approaches construct a binary trie for each prefix, where a binary trie is a tree with two kinds of nodes: branch nodes and element nodes. Unfortunately, the scalability and memory usage of trie-based approaches are both functions of the address length, which is disadvantageous when used with longer addresses such as in IPv6. Other data structures such as binary decision diagrams cannot be implemented in hardware in a streamlined fashion since they have inherent dependencies and are not scalable to large memories and address lengths. Field-programmable gate array (FPGA)-based approaches use memory and configurable logic block resources to implement a content addressable memory. While these approaches are good for quick prototyping, they are not good candidates for high-speed processing of large prefixes. Recently, Bloom filters have been proposed for network routers, where Bloom filters are known data structures that support membership queries with a small false positive rate. See Dharmapurikar S, K. P., Taylor, D. E., "Longest Prefix Matching Using Bloom Filters," in Proceedings of the 2003 Conference on Applications, Technologies, Architectures, and Protocols for Computer Communications, August 2003. Separate Bloom filters and hash tables are maintained for each distinct prefix length, and an incoming query is checked for membership in all Bloom filters. Any Bloom filter that results in a positive membership forwards the input query to the hash table corresponding to that prefix length. The drawback with this approach is that hash tables can result in collisions and, therefore, unpredictable performance. Furthermore, the hash tables are queried sequentially in decreasing order of prefix lengths in order to perform longest prefix matching. Another approach has been to construct a binary search tree with a near-optimal depth for a given number of prefixes, so that the worst case lookup time is bounded and deterministic. See P. Gupta, B. Prabhakar, and S. Boyd, "Near-Optimal Routing Lookups with Bounded Worst Case Performance," Proc. Infocom, Vol. 3, pp. 1184–92, March 2000. Unfortunately, this scheme relies on probabilities for different prefixes.

There is, accordingly, a need for an alternative design that is faster, less expensive and more scalable than existing content addressable memory designs. There is also a need for a practical content-based information retrieval mechanism that can take advantage of conventional memory such as SRAM or DRAM.

SUMMARY OF THE INVENTION

A content-based information retrieval architecture is herein disclosed that can achieve high speed lookups with a constant query time while taking advantage of inexpensive conventional memory components. In accordance with an embodiment of the invention, the architecture comprises a hashing module, a first table of encoded values, a second table of lookup values, and a third table of associated input values. The input value is hashed a number of times to generate a plurality of hashed values, the hashed values corresponding to locations of encoded values in the first table. The encoded values obtained from an input value encode an output value such that the output value cannot be recovered from any single encoded value. For example, the encoded values can be encoded by combining the values using a bit-wise exclusive or (XOR) operation, to generate the output value. The output value serves to select a lookup value in the second table and an associated input value in the third table. The table of encoded values can be constructed so that the output values are addresses in the second and third tables. If the associated input value in the third table is the same as the input value, then the input value is part of the lookup set and the selected lookup value corresponds to the input value. If the associated input value in the third table is not the same as the input value, then the input value is not in the lookup set. The third table can be used to perform filtering while the first table of encoded values is used for indexing into the second and third tables. The third table can be omitted, but at the price of possible false positives.

In accordance with another embodiment of another aspect of the invention, the tables can be segmented into a plurality of banks, each bank associated with one of the plurality of hashed values generated by the hashing module. This advantageously improves the access speed and obviates any need for multi-ported memories. In addition, the different parts of the information retrieval architecture, e.g., the hashing module and the table of encoded values, can be pipelined into different stages, thereby allowing implementation using conventional random access memory chips. The architecture can use stream-based data flow and can achieve very high throughputs via deep pipelining.

In accordance with another embodiment of the invention, the table of lookup values and the table of associated input values can be made smaller than the table of encoded values, so that the width of the encoded table is at least log(n), where n is the number of lookup values. This advantageously reduces the memory consumed by the tables. The table of encoded values preferably should be constructed using sequential address generation for the table of lookup values.

In accordance with another embodiment of the invention, a filtering module can be provided which performs pre-filtering on input values before passing an input value to the hashing module. The filtering module forwards an input value to the hashing module only if the input value is not a member of some filtered set of input values. For example, and without limitation, the filtered set of input values can be those input values that are recognized as not being members of the lookup set. This can result in significant power savings, since the tables in the information retrieval architecture are accessed only if the input value is part of the lookup set. Values can be added to the filtered set of input values, for example, when input values are recognized through use of the third table as not being part of the lookup set. The filtering module can also be used for other purposes. For example, the filtering module can be configured so as to remap certain input values into other more advantageous values that are forwarded to the hashing module. The filtered set of input values can be selected so as to facilitate construction of the first table of encoded values. For example, where an input value ends up generating a plurality of hashed values that correspond to not one singleton location in the first table of encoded values, this can complicate reconstruction of the table. It can be advantageous to add this value to the filtered set of input values and handle that value separately in a spillover table.

In accordance with another embodiment of the invention, a spillover table can be combined with an information retrieval architecture so as to handle input values that preferably should not be handled by the architecture. For example, the spillover table can comprise entries of input values that pose difficulties for setup of the architecture or which cause difficulties for the architecture such as false positives. Troublesome input values can be remapped by the spillover table into values that can more readily be handled by the information retrieval architecture. Values identified by the information retrieval architecture as problematic, such as values that result in false positives, can be fed back into the spillover table and intercepted to conserve on power.

One advantageous application of the present architecture is in network routers. A network router can be readily constructed using such an architecture to implement a plurality of filters which can perform longest prefix matching on a packet header, where the input value is a prefix of a pre-specified length and the lookup value is the forwarding information. An advantageous design is to utilize a plurality of filters, one for each prefix length operating in parallel. Where several of the filters signal a match, a priority encoder can be used to select the forwarding information from the filter with the longest prefix match. The filters can be implemented in pairs, where an update filter can be updated off-line and swapped for the filter that is performing lookups.

The content-based information retrieval architecture disclosed herein can be readily implemented in hardware or software or an advantageous combination of both. An implementation advantageously can be embodied in a single chip solution, with embedded memory, or a multi chip solution, with external SRAM/DRAM. The above-described architecture has a number of key advantages over related technologies. As discussed above, the design can use standard inexpensive memory components such as SRAM or DRAM, thereby facilitating ease of manufacture. The design is capable of high speeds, as it uses streaming data with no hardware dependencies and may be deeply pipelined to obtain high throughput. Additionally, the design has the potential to consume significantly less power than equivalent TCAM components. These and other advantages of the invention will be apparent to those of ordinary skill in the art by reference to the following detailed description and the accompanying drawings.

DETAILED DESCRIPTION OF THE INVENTION

Figure 1:
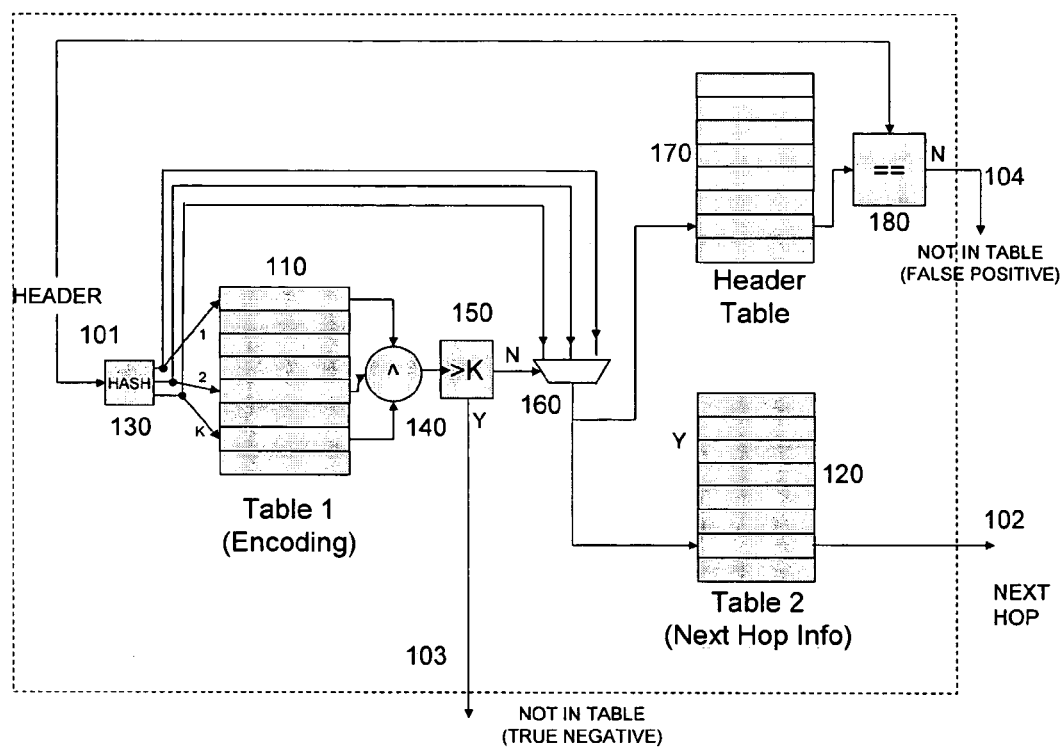
FIG. 1 is a diagram of a content-based information retrieval architecture, in accordance with an embodiment of an aspect of the invention.

FIG. 1 is a diagram of a content-based information retrieval architecture, in accordance with an embodiment of the invention. As depicted in FIG. 1, an input value 101 is received and processed by the architecture. Based on the processing of the input value 101, what is output is either a lookup value 102 retrieved from a table 120 or a signal 103, 104 that the input value 101 is not a member of the lookup set.

In FIG. 1, there are three tables 110, 120, 170 the construction and operation of which are described in further detail herein. Each table in FIG. 1 has the same number of entries, although, as further described herein and in accordance with another embodiment of the invention, the tables can have different numbers of entries. Table 120 is referred to herein as a lookup table and comprises a plurality of entries, each storing a lookup value. For example, in the case of a router application, the lookup values can be next hop information associated with different destination addresses prefixes. Table 170 is referred to herein as the false positive table (or alternatively as the filtering table) and comprises a plurality of entries, each storing an input value corresponding to a lookup value in table 120. Table 110 is referred to herein as the "encoding" table. Encoding table 110 is constructed so that there is a one-to-one mapping between every valid input value within a particular pre-defined lookup set and a unique location in lookup table 120, as described in further detail below.

To lookup the value 102 associated with an input value 101, the input value 101 is hashed k-times at 130 to produce k different values. The hash 130 can be implemented using any advantageous hash function. For example and without limitation, a combination of circular shifts, XORs, and ADDs can be used to obtain a very effective hash with good pseudo-random behavior. The k different hash values, $(h_1, \ldots, h_k)$, each refer to locations in the encoding table 110. Each $h_i$ is in the interval [1, m] where m is the number of entries in the encoding table 110 and the lookup table 120. Each entry in the encoding table 110 stores a value, Table1 $[h_i]$. The values Table1$[h_1]$ . . . Table1$[h_k]$ selected by the k hash values are bit-wise exclusive-ored at 140 to obtain the following value:

$$x = \oplus_{i=1}^{k} \text{Table1}[h_i]$$

This value can be used to check whether the input value 101 is part of the lookup set and/or to select the lookup value associated with the input value 101 in the lookup table 120. This is illustrated in FIG. 1. In FIG. 1, this value can be checked at 150. The value provides an index, say l, of one of the k hash functions and is checked by determining whether the index l is greater than the number of hash functions. If it is, then the input t is not a member of the set that is stored in the lookup table and, thus, does not exist in the table—and a signal 103 is produced. If on the other hand it refers to a valid index, then when t is hashed with $h_l$, it produces an address $\tau(t)$ into the second table 120 where $f(t)$ is stored. The address $\tau(t)$ in the lookup table 120 is obtained by using the index to select the output of the correct hash function at 160. Then, the address $\tau(t)$ in the lookup table 120 can be used to retrieve the lookup value $f(t)$ associated with the input value t.

There is, however, a small probability that the check at 150 will be passed even though the input value 101 is not part of the lookup set, as discussed below. Accordingly, a third table 170 is provided which can have the same number of entries as the lookup table 120. When the encoding table 110 is setup, the actual input values in the lookup set can be stored in the table 170. For an input value t, the hash function index corresponding to $\tau(t)$ can be encoded into the encoding table 110, the lookup information $f(t)$ can be stored in address $\tau(t)$ of the lookup table 120, and t itself can be stored in address $\tau(t)$ of the table 170. If a lookup for a header t' produces a valid pointer into the lookup table 120, t' is compared at 180 with the actual associated input value stored in the table 170. If t' and t are different, the lookup is a false positive and a signal 104 is generated.

Given a domain D and a range R, the structure depicted in FIG. 1 serves to encode an arbitrary function $f: D \rightarrow R$ such that querying with any element t of D results in a lookup value of $f(t)$. Any t that is not within the domain D is flagged with no false positives.

Construction of the encoding table 110 can proceed in a number of different ways. Given an input value t and an associated index value, l, the below equation for l defines a linear constraint on the values of the encoding table 110. The set of input values and associated indices defines a system of linear constraints, and these linear constraints may be solved using any of the many methods known in the literature for solving linear constraints. Alternatively, the following very fast method can be utilized that works with very high probability. The encoding table 110 is constructed so that there is a one-to-one mapping between every element t in the lookup set and a unique index $\tau(t)$ in the lookup table 120. It is required that this matching value, $\tau(t)$, be one of the hashed locations, $(h_1, \ldots, h_k)$, generated by hashing t. Given any setting of the table entries, the linear constraint associated with t may be satisfied by setting $$\text{Table1}[L] = l \oplus \oplus_{l \neq i=1}^{k} \text{Table1}[h_i].$$

However, changing the entry in the encoding table 110 of Table1$[\tau(t)]$ may cause a violation of the linear constraint for a different input value whose constraint was previous satisfied. To avoid this, an ordering should be computed on the set of input elements. The ordering has the property that if another input value t' precedes t in the order, then none of the hash values associated with t' will be equal to $\tau(t)$. Given such a matching and ordering, the linear constraint for the input elements according to the order would be satisfied. Also, the constraint for each t would be satisfied solely by modifying $\tau(t)$ without violating any of the previously satisfied constraints. At the end of this process, all of the linear constraints would be satisfied.

The ordering and $\tau(t)$ can be computed as follows: Let S be the set of input elements. A location L in the encoding table is said to be a singleton location for S if it is a hashed location for exactly one t in S. S can be broken into two parts, $S_1$ consisting of those t in S whose hashed locations contain a singleton location for S, and $S_2$, consisting of those t in S whose hashed locations do not contain a singleton location for S. For each t in $S_1$, $\tau(t)$ is set to be one of the singleton locations. Each input value in $S_1$ is ordered to be after all of the input values in $S_2$. The ordering within $S_1$ may be arbitrary. Then, a matching and ordering for $S_2$ can be recursively found. Thus, $S_2$ can be broken into two sets, $S_{21}$ and $S_{22}$, where $S_{21}$ consists of those t in $S_2$ whose hashed locations contain a singleton location for $S_2$, and $S_{22}$ consists of the remaining elements of $S_2$. It should be noted that locations that were not singleton locations for S may be singleton locations for $S_2$. The process continues until every input value t in S has been given a matching value $\tau(t)$. If at any earlier stage in the process, no elements are found that hash to singleton locations, the process is deemed to have failed. It can be shown, however, that when the size of the encoding table is sufficiently large, such a matching and ordering will exist and be found by the process with high probability. In practice, the encoding table size can be set to some initial size, e.g., some constant multiple of the number of input values. If a matching is not found, one may iteratively increase the table size until a matching is found. In practice, this is done by allocating different portions of a given memory chip. There is a small chance that the process will still fail even with a table of sufficiently large size due to a coincidence among the hash locations. In this case, one can change the hash function used. Hash functions with seeds may be used. Note that one must use the same hash function for looking up values as one uses during the construction of the encoding table.

If all of these above strategies fail, some input values may be dropped. Specifically, an entry in the table $R_i$ that has two incoming pointers can be checked; one of the elements responsible for an incoming pointer can be removed from the set of elements. This automatically makes $R_i$ a $\tau(t)$ for some t, thereby increasing the chances of convergence of the setup procedure. Note that this is similar to a TCAM, where headers that cannot fit in the available memory are dropped. The present architecture can report the dropped input values and handle them as a special case. As further described below, such input values can be handled in a spillover table.

One advantage of the architecture depicted in FIG. 1 is the ability to filter out false positives. The false positive table 170 and its associated logic can be removed, resulting in the architecture depicted in FIG. 2 which allows a small probability of false positives. It should be noted that the effective speed of the architecture in FIG. 1 is independent of whether or not the extra table 170 is used to remove false positives.

False positives may or may not be an acceptable condition for the information retrieval architecture. Where a false positive occurs, it should be noted that the lookup result would be random selection of one of the possible lookup values. Thus, a router using such a lookup mechanism would send packets with no forwarding information to a random destination rather than a default destination. Such an action could potentially result in extra traffic on bandwidth-limited paths, for example where a destination is expected to service only QoS-designated packets. Fortunately, the probability is small. For a perfectly random hash function, if the encoding table 210 is q bits wide and has k hash functions, it can be shown that the theoretical upper bound for the probability of false positives is:

$$Prob(FP) = \frac{k}{2^q}$$

Thus, for a 32-bit wide table with four hash functions, the false positive rate is bounded by 4 in 1 billion, i.e., for every billion headers that are not in the table, four will likely be false positives, while the others will be correctly flagged as not being present in the table. Further, the probability of successive false positives decreases exponentially. In other words, a given input value is very unlikely to encounter two or more successive false positives. Also, two packet header values encountering false positives are unlikely to be sent along the same bandwidth-limited path.

Figure 2:
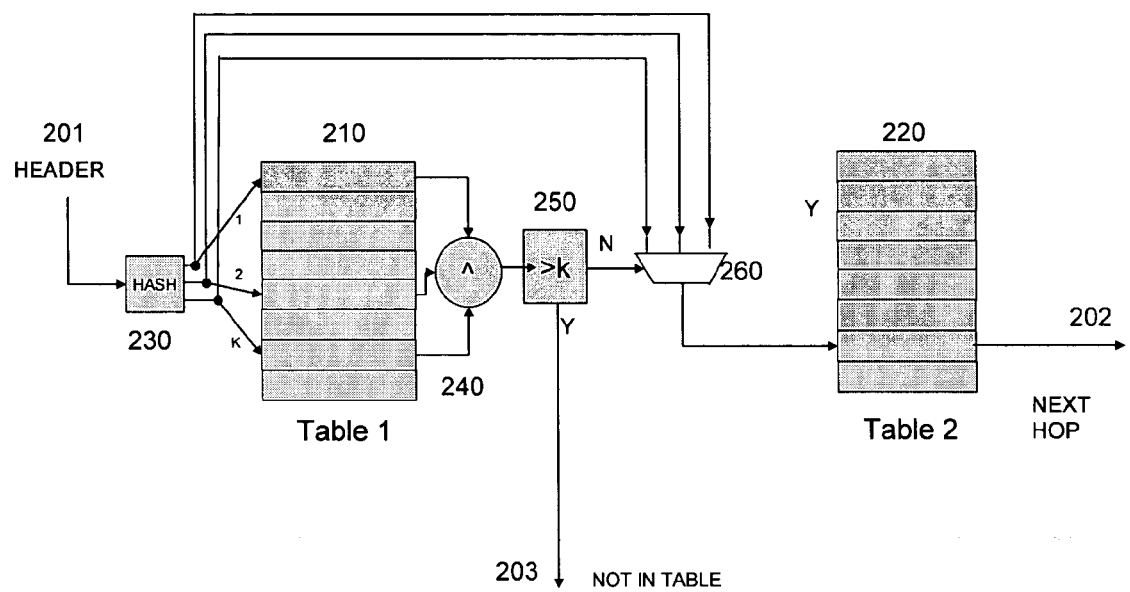
FIG. 2 is a diagram of another content-based information retrieval architecture that permits false positives.
Figure 4:
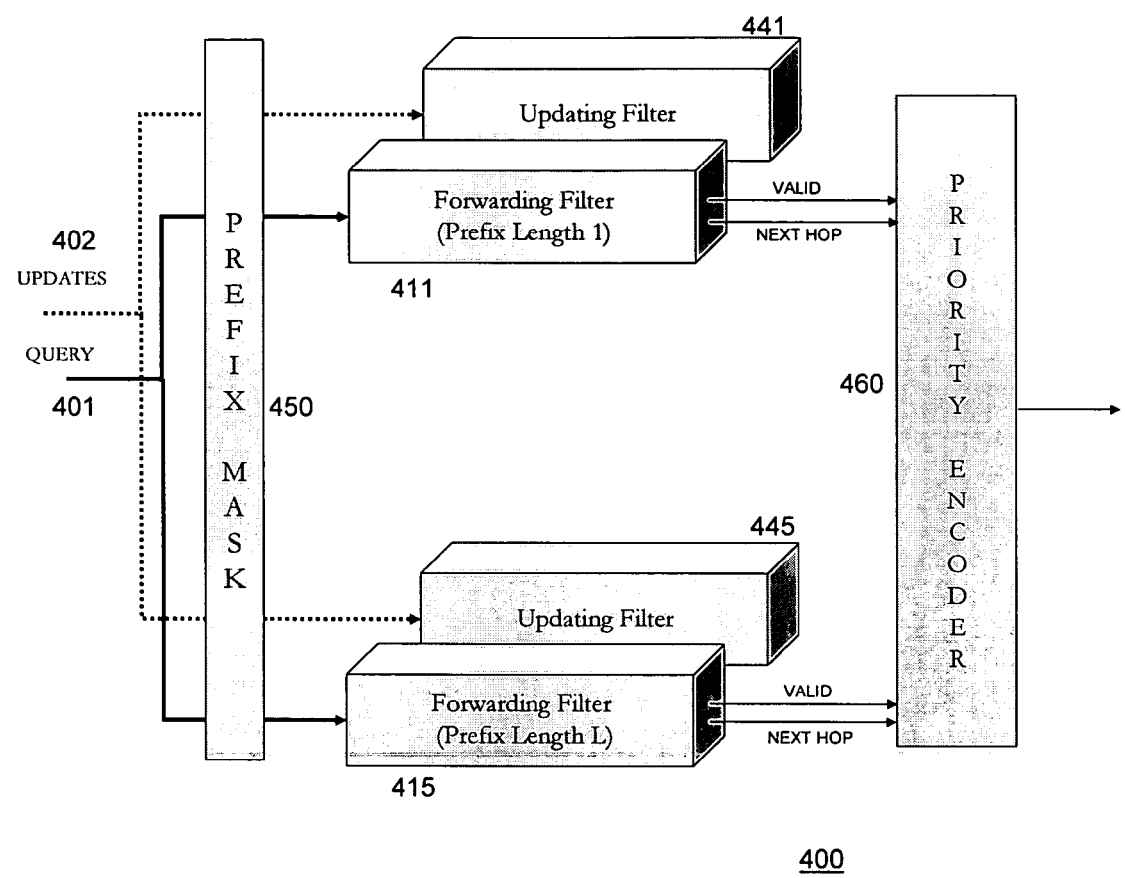
FIG. 4 is a diagram of a longest prefix matching network router, constructed in accordance with an embodiment of another aspect of the invention.
Figure 5:
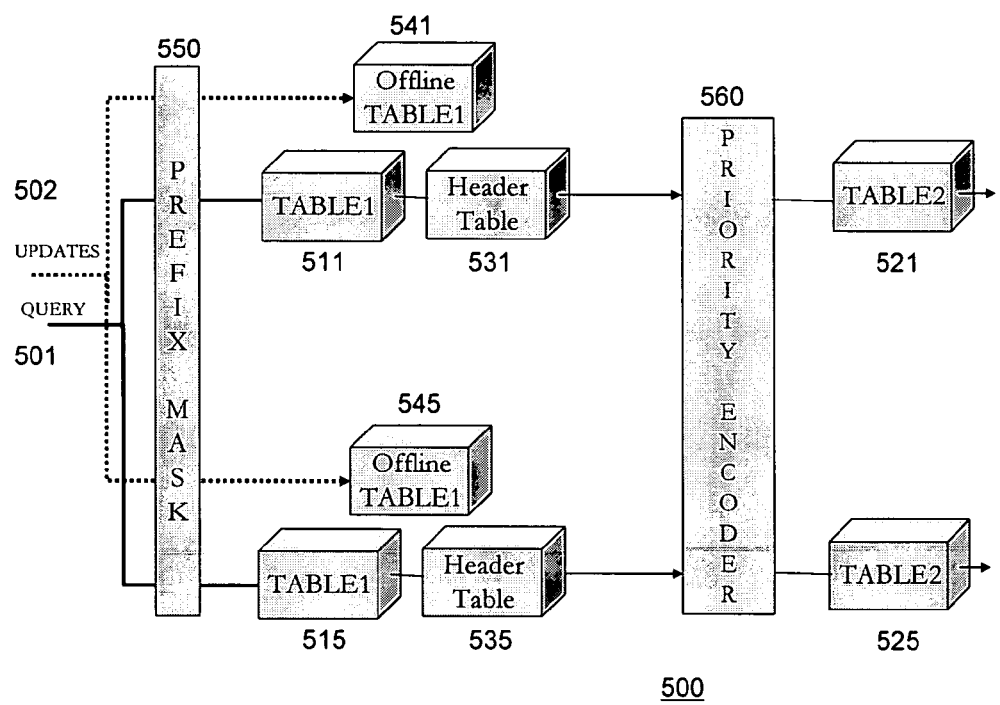
FIG. 5 is a diagram of an alternative network router architecture, constructed in accordance with another embodiment of the invention.
Figure 6:
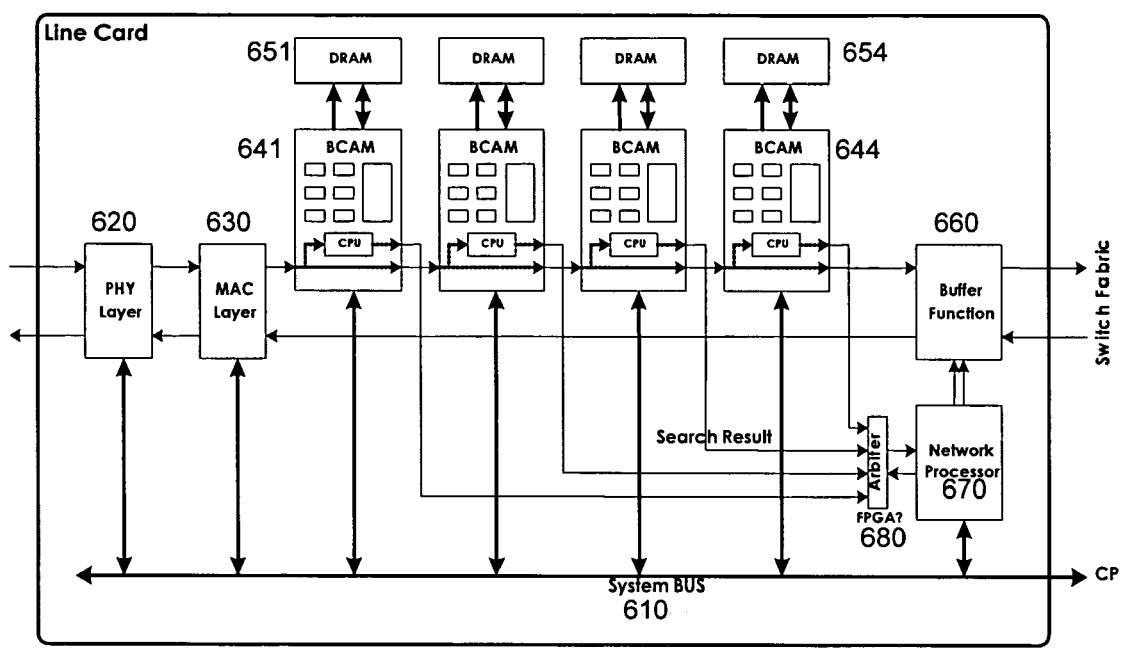
FIG. 6 is a diagram of an illustrative router line card.

The information retrieval architecture shown in FIGS. 1 and 2 is particularly advantageous in a network router application, as illustrated by FIGS. 4 through 6. FIG. 4 shows the architecture of a network router 400, in accordance with an embodiment of this aspect of the invention.

The router 400 is configured to employ longest prefix matching (LPM) in order to forward a packet, such as an Internet Protocol (IP) datagram. The routing table is setup to handle a plurality of prefixes, each prefix being of length L and consisting of the first L bits of an IP address. Shorter prefixes may subsume longer ones, i.e., a longer prefix may refine the forwarding information of a shorter prefix. Therefore, a lookup must be performed to determine whether an incoming IP address matches the longer possible prefix. The basic architecture in FIG. 4 comprises lookup filters 411, . . . 415, each lookup filter based on the content-based information retrieval architecture described above, for each unique prefix length. The lookup filters 411, . . . 415 are set up with the prefixes corresponding to their designated length. During operation, the input query 401 is sent to all filters 411, . . . 415 in parallel, and the results from each filter 411, . . . 415 are sent to a priority encoder 440. Some filters will give a "positive output" (i.e., indicate a match with a prefix with a small false positive probability), while others will not. From among the filters that indicate a match, the output of the one corresponding to the longest prefix is used as the forwarding information for the input query.

In addition to normal forwarding operation, routers will frequently need to update their tables. Entries are continuously removed, while other entries are added. In order to perform routing updates, it is advantageous to maintain a separate (parallel) set of filters 421, . . . 425. These filters 421, . . . 425 are referred to as update tables while the other filters 411, . . . 415 are referred to as the forwarding tables. Each distinct prefix length has one update table and one forwarding table. The forwarding tables actively forwarding packets, while the update tables perform routing updates offline. When a sufficient number of updates have been performed, the roles of the tables can be swapped. The update table is "brought online", i.e., made a forwarding table, and the forwarding table plays the role of the update table. Note that the entries in the two tables should be identical at the point of swapping. In order to ensure this, the forwarding table should update all its entries from the update table before the swap.

In network routers, elements are removed and added constantly. Updates to the router 400 can be performed using a combination of hardware and software techniques. For example, the following schemes can be used to enable the above content addressable memory to add, remove, and change the forwarding information of a header:

Addition of a header: When a new header t has to be added to the lookup filter that is already setup with several elements, $\tau(t)$ has to be found. If t has a hash value S that no other t' in the table hashes to, then S is a viable candidate for $\tau(t)$. However, if t does not have such a hash value, it is necessary to setup the filter again (or alternatively, as described later, it may be inserted into a spillover table). This can be done using an embedded or attached processor, e.g., in software. If can also be done offline using the update tables, and, therefore, does not need to affect the throughput of lookups.

Removal of a Header: Removing an element can be done without software assistance. Each filter table entry can be augmented with a "dirty bit" and a count of the number of hashed locations that point to that entry. When an element t is removed, the dirty bits corresponding to all hashed locations of t are turned on. At the same time, the count is decremented indicating that one less hashed location points to the entries of t. A lookup of an element u must ensure that all dirty bits of the hashed locations of u are not 1. When a new element v is added to the table, all of its hashed locations must reset their dirty bits. Note that removal of an element increases the probability of finding $\tau(t)$ for elements that need to be added.

Changing Forwarding Information: Changing the forwarding information for an element t is trivial in the embodiment depicted in FIG. 1. The separation of the data structure into separate tables 110 and 120 is advantageous in that it enables the lookup table 120 to be readily updated without affecting the encoding table 110. If the forwarding information for a header needs to be changed, it is only necessary to update the relevant location in lookup table 120. This may be readily accomplished, for example, in hardware. Only if $f(t)$ is encoded into encoding table 110 is it necessary to setup the entire structure again.

FIG. 5 shows an alternative architecture for the network router 500, in accordance with another embodiment of the invention, that takes advantage of the structure of the information retrieval architecture depicted in FIG. 1. Rather than implementing the forwarding table filters with a full destination address lookup conducted for each prefix length, it is advantageous to perform the lookup on the relevant lookup table 521, . . . or 525 only after the priority encoder 560 has selected the longest prefix match. Thus, the lookup filters need only to implement the encoding tables 511 . . . 515 and, where desired, the false positive tables 531, . . . 535. Moreover, the update tables advantageously need only be implemented with offline versions of the encoding tables 541, . . . 545, as depicted in FIG. 5. As disclosed and discussed in further detail below, the lookup table can be architected smaller than the encoded table in a manner that would not need the lookup table to be duplicated for the online/offline architecture.

In the worst case, the number of filters will be equal to the number of bits in the network address. For IPv6, for example, this leads to 128 filters. It is, however, possible to reduce this number. For example, prefix expansion, where a smaller prefix is expanded to accommodate a larger prefix, can be used to eliminate certain prefix lengths. Alternatively, a simple hash table or a direct lookup array can be used to replace prefix lengths with very few members. In practice, the number of distinct prefix lengths is few. For instance, IPv4, where each address is 32 bits, has around 8–10 active prefix lengths, and it has been shown that IPv6 traces typically 14 distinct prefix lengths. These can be further reduced using the schemes mentioned above.

In a given router, all prefix lengths do not occur with equal frequency. Usually, a few prefixes occur most of the time, while some prefix lengths do not occur at all. Therefore, it is possible that some filters will be relatively "over-populated". In order to set-up the filters and maintain false positive rates, some filters will require more memory than others. It may be advantageous to distribute the DRAM memory laid out on the board in equal proximity to all the filter chips. During configuration of the router, i.e., before start-up, a profile of the IP addresses can be used to appropriately assign memory banks to specific filters. Thus, filters handling frequent prefix lengths can be assigned more banks, while other filters can be assigned fewer banks. Note that this can be dynamically changed during routing updates: for instance, if the size of a particular filter grows and another filter decreases in size, some memory banks can be "re-allocated". The board can thus be reconfigured on the fly to retain maximum flexibility. FIG. 6 shows an example of a line card 600 architecture that shows, along with the associated processor 670 and other relevant circuitry, several content addressable memories 641, . . . , 644 using conventional DRAM 651, . . . , 654, each content addressable memory implementing the content-based information retrieval architecture described above.

Figure 3:
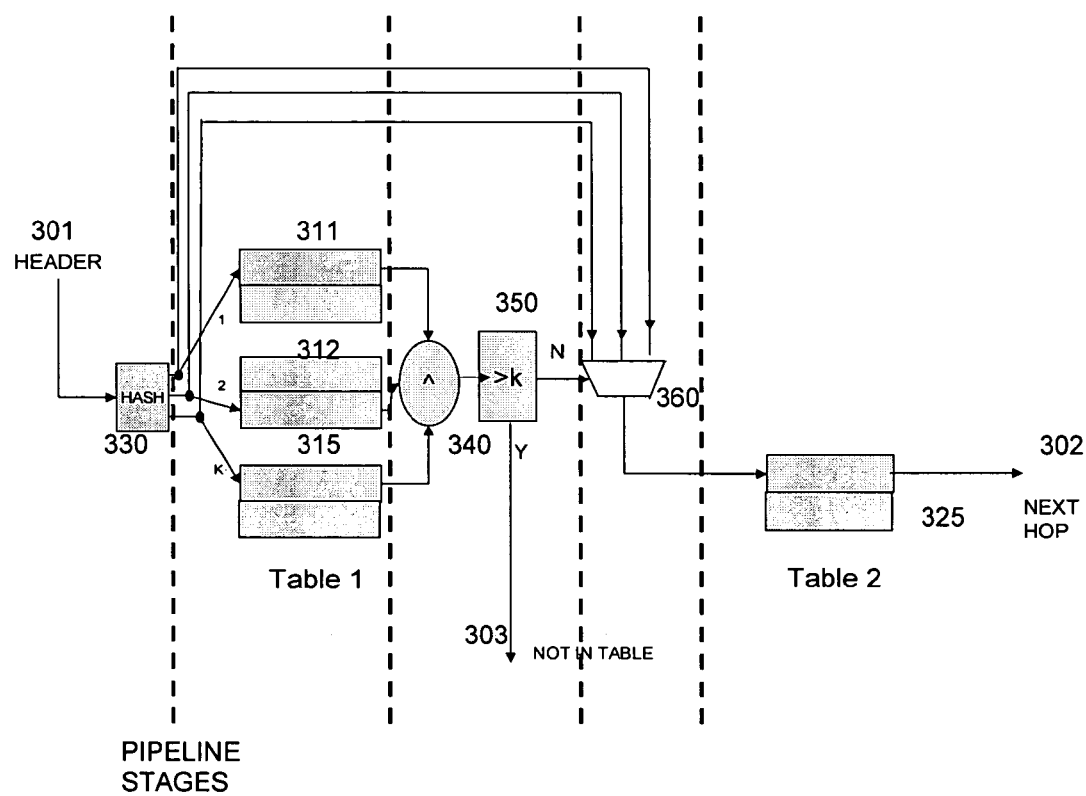
FIG. 3 is a diagram illustrating segmented memory and pipelining in a content-based information retrieval architecture, in accordance with an embodiment of another aspect of the invention.

The architecture depicted in FIGS. 1 and 2 may be further optimized by utilizing segmented memory and fine-grained pipelining, as illustrated by FIG. 3.

As in FIG. 1, an input value 301 is hashed k-times at 330 to produce k different values. The k different hash values, however, do not refer to locations in a single unitary encoding table, like 110 in FIG. 1. In order to maintain high memory access speeds, it is preferable to reduce the number of read and write ports for each memory bank. As depicted in FIG. 3, it can be advantageous to distribute the memory of each table in the architecture into k or more banks, where k is the number of hash functions. Each hash function indexes a unique memory segment and is, then, required to access a particular bank. So, each bank 311, 312, . . . 315 in the encoding table 310 need only have exactly one read and write port (i.e., like standard memory components), thus obviating the need for multi-ported memories and improving access speeds. It can be shown from simulations that this design does not adversely affect the false positive rate or the required memory sizes.

It is also possible to take advantage of the structure of the information retrieval architecture to create a finely pipelined hardware architecture. FIG. 3 shows the different stages where the hardware may be pipelined. As shown in FIG. 3, unlike hardware realizations of tries or hash tables, there are no dependencies or indeterminate collisions chains in the approach. The hardware realization allows for streaming data, permits a highly pipelined implementation, as well as pipelined memory accesses. Thus, the memories can be implemented using conventional off-chip DRAMs. Double-data rate DRAMs and RAMBUS memory that allow effective throughputs of more than 400 million accesses per second are an attractive choice.

Figure 13:
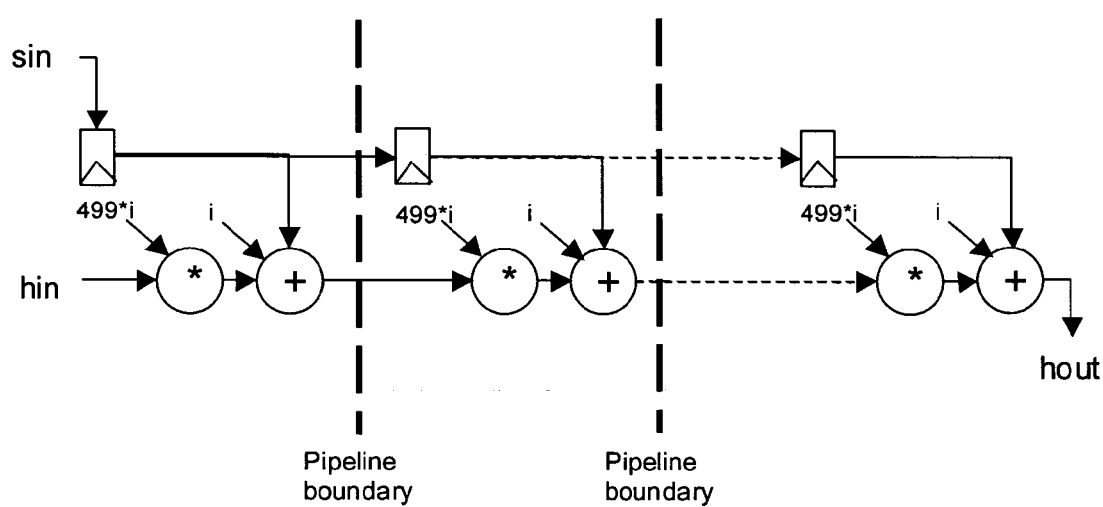
FIG. 13 is a diagram illustrating the operation of a pipelined hash function.

The hash functions and the XOR computation may also be pipelined. FIG. 13 shows an implementation of a string hash function, and a possible pipelined implementation. The multipliers are simplified since one operand is constant. Further they may be pipelined as well. Note that since the prefixes are of different lengths, the hash functions operating on shorter prefixes will require additional delay stages in order to be "in step" with the other hash functions. This feature may be used to design a very effective stream-based architecture for hash functions. FIG. 13 shows the string hash function and the pipelined implementation for the i'th hash function.

The amount of memory utilized in a hardware implementation of the present architecture is an important consideration to decide trade-offs between embedded and off-chip memory. The memory size of the architecture depicted in FIG. 1 is the combined size of the encoding table 110 and the lookup table 120, and the header table 170 if present. Encoding table 110 needs to be as large as necessary to allow the lookup structure to be setup, i.e., all elements must have a match $\tau$. In addition, the width of the encoding table 110, q, should be made as high as required to reduce the false positive rate (which, as mentioned above, is inversely proportional to $2^q$). An embodiment with segmented memory containing 500,000 entries would have 1 million entries in the encoding table 110, each with a width of 24 bits. The lookup table 120 would also have 1 million entries (unless the embodiment described below for smaller lookup tables is used), each holding corresponding lookup information. Assuming the lookup information is usually small, i.e, 8 bits, we can expect the two tables to be around 4 MB together. Using recent ASIC and memory technology, the memory may be implemented on-chip as embedded SRAM. If more memory is required (for instance, if more entries need to be stored in the filter), off-chip DRAM may be used. The streaming data and pipelined implementation, as mentioned above, allow the use of double-data rate DRAM to achieve high throughput.

A technique to reduce memory usage is to implement the architecture depicted in FIGS. 1 and 2 with a single encoding/lookup table, not two separate tables. Having two tables provides the flexibility of updating the lookup value associated with an element. For instance, if one needs to only update the forwarding information for an IP address in a network application, only the corresponding entry in the lookup table 120 has to be modified. However, in many IP routes, updates mostly involve insertion of new addresses, or deletion of old ones. If this is the case, the lookup table 120 in FIG. 1 can be done away with. Instead, the encoding table 110 can be configured with actual values, XORed with the other entries appropriately such that the value obtained results in a correct lookup. This technique can save 25% of the memory.

Figure 7A:
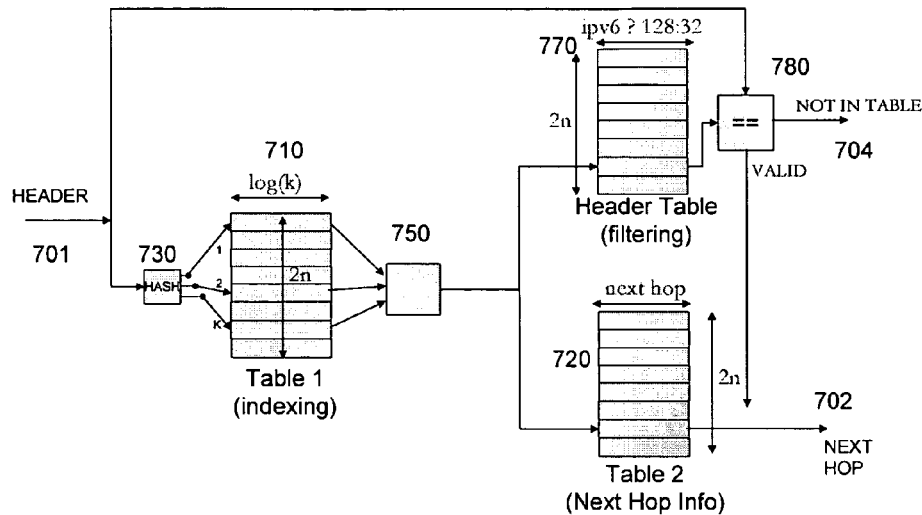
FIGS. 7A and 7B are diagrams illustrating another content-based information retrieval architecture that utilizes reduced memory.
Figure 7B:
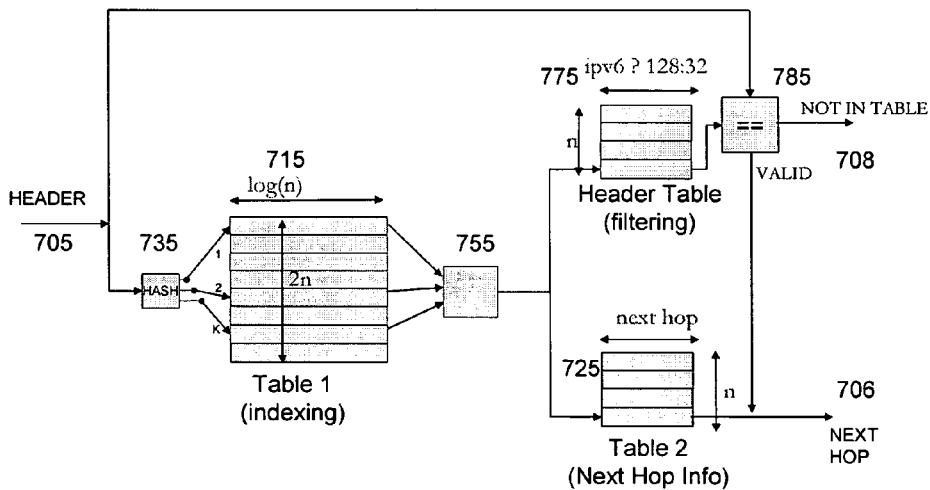

Another technique to reduce memory usage is illustrated by FIGS. 7A and 7B. FIG. 7A illustrates an embodiment where, as described above with respect to FIG. 1, the lookup table 720 and the false positive table 770 are exactly the same depth as the encoding table 710. Each has 2n entries and the encoding table has a width of log(k), where n is the number of entries that need to be stored and k is the number of hash functions. In accordance with another embodiment of the invention, and with reference to FIG. 7B, the encoding table can be resized in an advantageous manner. Instead of providing an index into the lookup table using the hash functions, the encoding table, 715 in FIG. 7B, can store the entire index into the lookup table, 725 in FIG. 7B. The encoding table 715 is made a little larger while decreasing the size of both the lookup table 725 and the false positive table 775. This results in considerable memory savings.

The encoding table 715 setup could proceed in a manner similar to that described above for FIGS. 1 and 2. The primary difference is that an address generator would be maintained for the lookup table 725. The address generator can be easily implemented as a counter that is initialized to zero. When an element t is added to the encoding table 715, the address from the address generator is encoded into $\tau(t)$, the matching location for t. This represents the address in the lookup table 725 where the next hop information, or more generally $f(t)$, will be stored. Once t is done, the address generator is incremented for the next element.

An important benefit of having sequential address generation for the lookup table 725 is that the need for duplicating the lookup table as well as the false positive table for the offline filters in the above network application is obviated. The reason for this is that changes to the lookup table and the false positive table are very minor and do not require table duplication. When an element t needs to be added, in the worst case, the entire forwarding table will need to be setup. The lookup table indices for the elements already in the table can be retained. Thus the only entry in the lookup table and the false positive table that needs to be changed is the entry for t. This change is simple and can be made directly to the active lookup table and the active false positive table.

As depicted in FIG. 7B, and in accordance with another embodiment of the invention, the encoding table 715 is made responsible for the indexing mechanism while filtering table 775 is responsible for filtering. Thus, the tables are accessed upon every lookup, which can adversely affect power consumption.

Figure 8:
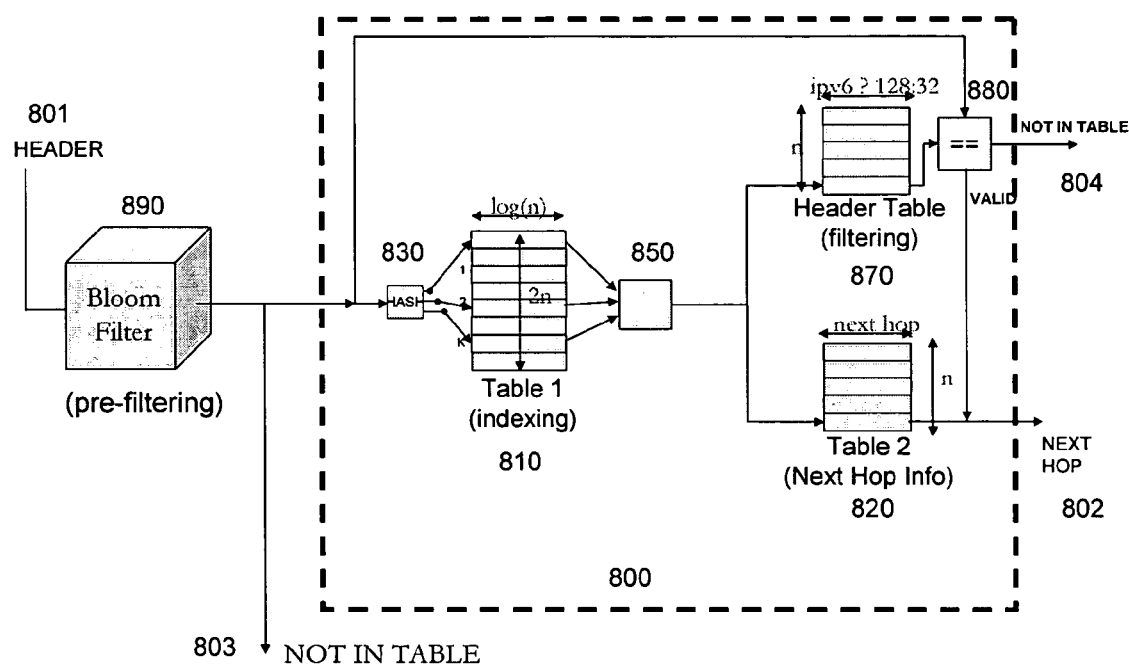
FIG. 8 is a diagram of another content-based information retrieval architecture illustrating the mechanism of pre-filtering.

FIG. 8 shows an alternative architecture, in accordance with another embodiment of the invention. In order to limit header table accesses, a filter 890 is inserted before the information retrieval architecture 800. The filter 890 can be implemented using any advantageous mechanism for conducting membership queries on the lookup set, such as, for example, a Bloom filter. See Bloom B. H., "Space/Time Trade-offs in Hash Coding with Allowable Errors," Communications of the ACM, 13(7), p. 422–26 (July 1970). The filter 890 performs pre-filtering and ensures that the only accesses to the tables are those entries that should be present in the tables (and any false positives that may be permitted by the pre-filter 890). For the longest prefix matching application described above, this embodiment also provides additional gains. Each lookup is likely to be present in only a few prefixes, if any at all. Therefore, most of the prefix filters will not be accessed, resulting in significant power savings.

Figure 9:
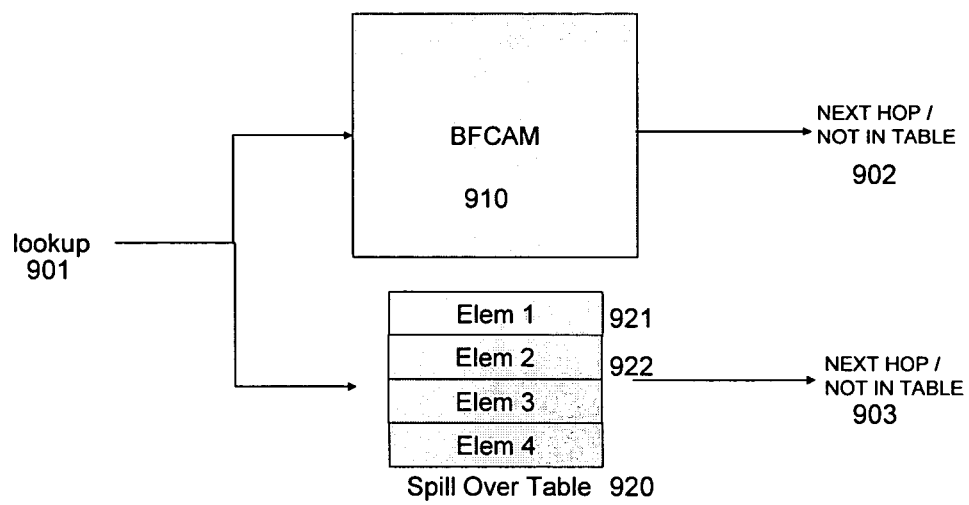
FIGS. 9 and 10 are diagrams illustrating the usage of a spillover table.
Figure 10:
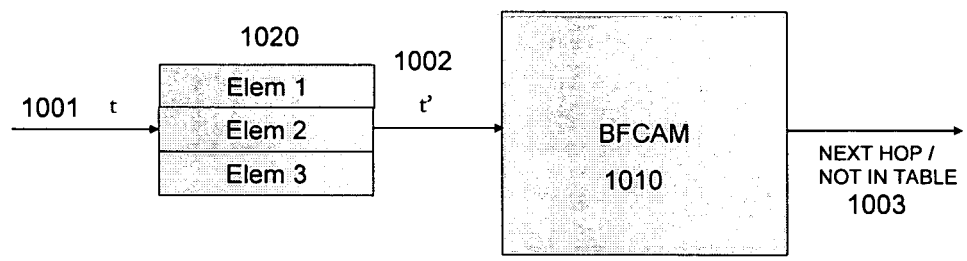
Figure 11:
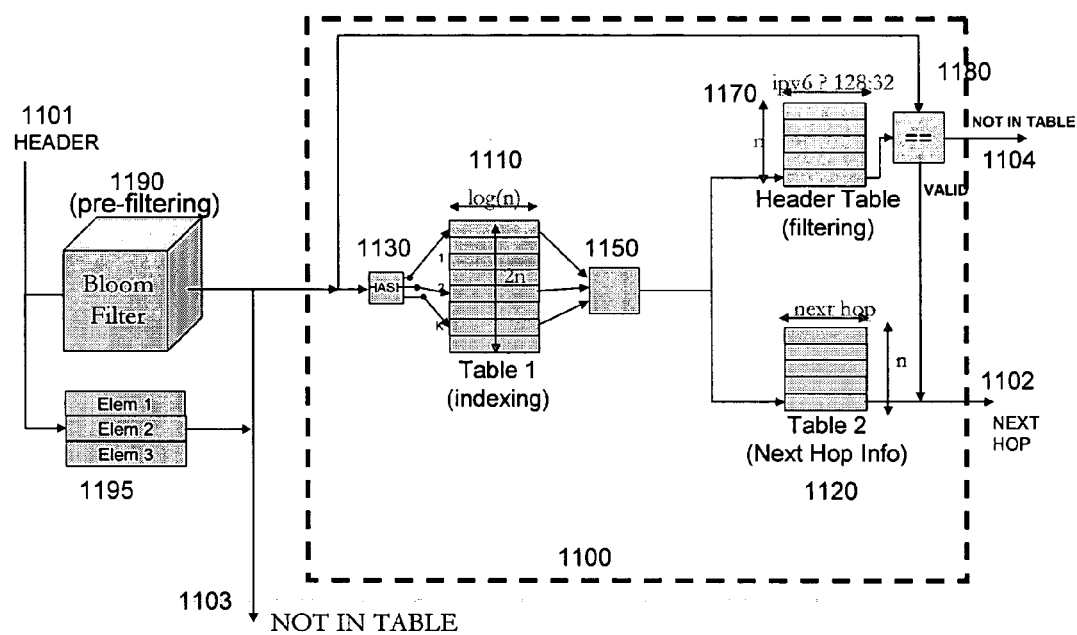
FIG. 11 is a diagram of content-based information retrieval architecture utilizing pre-filtering and a spill-over table.

The architecture may be further improved by the use of what the inventors refer to as a "spillover" table, as illustrated in FIGS. 9, 10, and 11. A spillover table is a table which comprises a small number of input values which either cannot or preferably should not be handled by the information retrieval architecture. With reference to FIG. 9, an input value 901 is sent to some information retrieval architecture 910 which may or may not be similar to the architectures described above. A spillover table 920 is also provided which includes a variety of entries 921, 922, . . . etc. If the input value 901 matches an entry in the spillover table 920, then the processing of the input value 901 is handled by the spillover table 920 in lieu of the information retrieval architecture 910.

There are a variety of reasons why such a table would be useful:

Table setup: The setup mechanisms described above for constructing the encoding table fails when singletons cannot be found at each step of the recursive setup process. This will happen, for instance, in the unlikely event that all k hash functions of two distinct elements exactly coincide. If singletons cannot be found, an element one of whose hash values points to the table entry with the least incoming pointers can be selected to be removed from the information retrieval architecture. This element t can then be inserted into the spill-over table. It may be shown that the probability of table setup failure due to coinciding hash functions falls exponentially with the size of the spill-over table. For instance, the probability of setup failure for a million entry architecture is approximately $10^{-14}$. This falls to around $10^{-140}$ with a setup table of size 10.

Addition of elements without singletons can also be better facilitated using the spill-over table. In order to add such elements to an encoding table that is already setup, the encoding table would need to be rebuilt from scratch. However, the element could also be added to the spill-over table. Given that deletions and additions are usually interspersed evenly, there may seldom be a need to completely rebuild the encoding table with a moderately sized spill-over table.

Remapping elements: As a general matter, a small spill-over table can be used to remap any "troublesome" elements into other elements in order to aid the table setup process. This is, for example, illustrated in FIG. 10. An input value 1001 is first sent to the spillover table 1020. If it matches one of the entries in the spillover table 1020, the input value 1001 is remapped into another value 1002. Presumably, this value 1002 is more advantageous to the information retrieval architecture 1010 in some fashion and can be more readily processed to generate the correct lookup value.

Storing False Positives: False positives require access to all the tables in order to be identified as such. As lookups proceed, elements that produce false positives can be stored in a spill-over table located near the beginning of the filtering architecture. Thus, future lookups of these elements will only need a single access, thereby saving considerable power.

Figure 12:
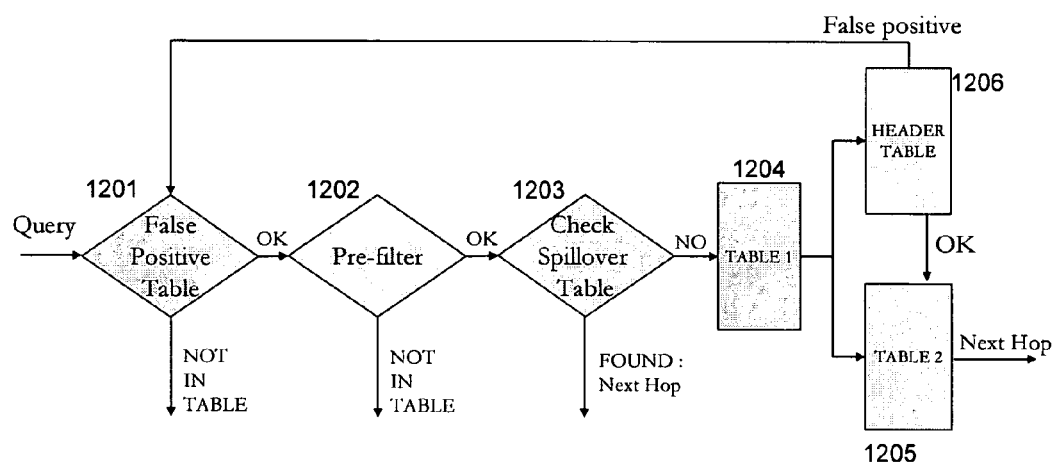
FIG. 12 is a flowchart of processing performed by the architecture depicted in FIG. 11.

FIG. 11 illustrates the usage of pre-filtering at 1190 with a small spill-over table 1195 along with the content-based information retrieval architecture 1100 shown above in FIG. 7B. FIG. 12 shows a flowchart illustrating the interaction between the different processing elements. As depicted in FIG. 12, false positives identified at the filtering table 1206 are fed back at 1201. Pre-filtering is also utilized at 1202 to further reduce table lookups.

The above-described information retrieval architecture has a number of key advantages over related technologies. As discussed above, the design can use standard inexpensive memory components such as SRAM or DRAM, thereby facilitating ease of manufacture. The design is capable of high speeds (potentially searching at rates exceeding 100 million entries per second), as it uses streaming data with no hardware dependencies and may be deeply pipelined to obtain high throughput. Additionally, the design has the potential to consume six times less power (about 50 nW per bit) than equivalent TCAM components. It should be noted that the memory requirements of the above designs increase faster than the storage required in a TCAM because it is assumed that the number of distinct prefix lengths in the stored headers increases with the number of headers. When the number of prefix lengths stabilizes, however, the rate of increase of memory would be similar to a TCAM.

The inventors have performed simulations that demonstrate that the design can readily outperform a lossless hash table and that the rate of false positives is very similar for filters with and without segmented memory. The inventors have also found that the table size first decreases with an increase in the number of hash functions, and then increases. This is because increasing the number of hash functions has two conflicting effects. First, it improves the chances of finding singletons since more entries are hashed. However, more hash functions also increase the probability of each entry being pointed to. This decreases the chances of finding singletons, and tends to increase the table size at which the filter set up process converges. Using segmented memory also increases the table size. A larger table size is expected with segmented memories since the hash functions are now restricted to within their memory segments. In a sense, they are not as "random" as with a non-segmented memory. This decreases the chances of finding singletons, and could therefore require a larger memory size to converge during setup.

It will be appreciated that those skilled in the art will be able to devise numerous arrangements and variations which, although not explicitly shown or described herein, embody the principles of the invention and are within their spirit and scope. For example, and without limitation, the present invention has been described with particular reference to network router applications and content addressable memories. The present invention, nevertheless and as mentioned above, is readily extendable to other applications.

What is claimed is:

1. A content-based information retrieval architecture comprising:
    a hashing module that receives an input value and generates a plurality of hashed values from the input value;
    a first table storing a plurality of encoded values, each hashed value generated from the input value corresponding to a location in the table of an encoded value;
    a second table storing a plurality of lookup values; and
    a third table storing a plurality of associated input values in a lookup set, each such input value associated with a lookup value in the second table,
    where the first table is constructed so that the encoded values, obtained from the hashed values generated from an input value, encode an output value such that the output value cannot be recovered from any single encoded value and such that the output value selects a lookup value in the second table and an associated input value in the third table, thereby identifying the input value as being in the lookup set if the input value is same as the associated input value in the third table.

2. The information retrieval architecture of claim 1 wherein the encoded values in the first table encode the output value such that the output value is recovered by combining the encoded values by performing a bit-wise XOR operation.

3. The information retrieval architecture of claim 1 wherein the lookup values are stored at unique addresses in the second table and wherein the first table of encoded values is constructed so that the output value encoded by the plurality of encoded values is an address in the second table.

4. The information retrieval architecture of claim 1 wherein the first table is constructed so that the second table has a size that is smaller than the first table and so that the width of the first table is at least log(n) where n is the number of lookup values.

5. The information retrieval architecture of claim 1 wherein the first table is segmented into a plurality of banks, each bank associated with one of the plurality of hash values generated by the hashing module.

6. The information retrieval architecture of claim 1 wherein the hashing module and the first table are pipelined into different stages from the second and third tables.

7. The information retrieval architecture of claim 1 further comprising a filtering module which receives input values and forwards the input value to the hashing module only if the input value is not a member of a filtered set of input values.

8. The information retrieval architecture of claim 7 wherein the filtered set of input values are those input values that are not recognized as being members of the lookup set of input values.

9. The information retrieval architecture of claim 7 wherein the filtered set of input values are those input values selected so as to facilitate construction of the first table of encoded values.

10. The information retrieval architecture of claim 9 wherein the filtered set of input values comprises at least one input value such that, when the hashing module generates a plurality of hashed values from the one input value, the hashed vlaues generated from the one input value correspond to not one singleton location in the first table of encoded values.

11. The information retrieval architecture of claim 7 wherein at least one input value is remapped by the filtering module into another input value that is then forwarded to the hashing module.

12. The information retrieval architecture of claim 7 wherein at least one input value, that is recognized as not being in the lookup set because the associated input value in the third table is not same as the one input value, is added to the filtered set of input values used by the filtering module.

13. The information retrieval architecture of claim 1 wherein the first table is used to perform indexing into the second table and third table while the third table is used to perform filtering.

14. A network router comprising at least one filter to perform a lookup on information in a packet header, the further thither comprising:
    a hashing module that receives the information in the packet header and generates a plurality of hashed values from the information in the packet header; and
    a first table storing a plurality of encoded values, each hashed value generated from the information in the packet header corresponding to a location in the first table of an encoded value, the table constructed so that the encoded values obtained from the information in the packet header encode an output value such that the output value cannot be recovered from any single encoded value and such that the output value is used to select forwarding information for the packet header.

15. The network router of claim 14 wherein the encoded values in the first table encode the output value such that the output value is recovered by combining the encoded values by performing a bit-wise XOR operation.

16. The network router of claim 14 wherein the information in the packet header is a prefix of a pre-specified length.

17. The network router of claim 16 further comprising one or more additional filters for prefixes of different pre-specified lengths, each filter performing lookups in parallel.

18. The network router of claim 17 further comprising an update filter for each filter, the update filter comprising a version of the first table that can be updated offline and swapped for the first table in the filters.

19. The network router of claim 17 further comprising a priority encoder that receives results from each filter and selects forwarding information based on the results from the filter handling a prefix of a longest length.

20. The network router of claim 14 wherein the first table is segmented into a plurality of banks, each bank associated with one of the plurality of hash values generated by the hashing module.

21. The network router of claim 14 wherein the hashing module and the first table are pipelined into different stages.

22. The network router of claim 16 further comprising a filtering module which receives the prefix in the packet header and forwards the prefix to the hashing module only if the prefix is not a member of a filtered set of prefixes.

23. The network router of claim 22 wherein the filtered set of prefixes are those prefixes that are not recognized as being members of a lockup set of prefixes.

24. The network router of claim 22 wherein the filtered set of prefixes are those prefixes selected so as to facilitate construction of the first table of encoded values.

25. The network router of claim 24 wherein the filtered set of prefixes comprises at least one prefix such that, when the hashing module generates a plurality of hashed values from the one prefix, the hashed values generated from the one prefix correspond to not one singleton location in the first table of encoded values.

26. The network router of claim 22 wherein at least one prefix is remapped by the filtering module into another prefix that is then forwarded to the hashing module.

27. The network router of claim 19 further comprising a second table storing the forwarding information as a forwarding value associated with each prefix.

28. The network router of claim 27 wherein each filter has an associated second table.

29. The network router of claim 27 wherein the priority encoder selects the filter handling the prefix of a longest length and then retrieves the forwarding information from a second table shared by the filters.

30. The network router of claim 27 further comprising a third table storing a plurality of associated prefixes in a lookup set, each such associated prefix associated with a forwarding value in the second table, where the output value selects a forwarding value in the second table and an associated prefix from the third table, thereby identifying the prefix in the packet header as being in the lookup set if the prefix in the packet header is same as the associated prefix in the third table.

31. The network router of claim 30 wherein the first table in the filters is constructed so that the second table has a size that is smaller than the first table and so that the width of the first table is at least log(n) where n is the number of forwarding values.

32. The network router of claim 30 further comprising a filtering module which receives the prefix in the packet header and forwards the prefix to the hashing module only if the prefix is not a member of a filtered set of prefixes, wherein at least one prefix, that is recognized as not being in the lookup set because the associated prefixes in the third table is not same as the one input value, is added to the filtered set of prefixes used by the filtering module.

33. A content-based information retrieval architecture comprising:
  a hashing module that receives an input value and generates a plurality of hashed values from the input value;
  a table storing a plurality of encoded values, each hashed value generated from the input value corresponding to a location in the table of an encoded value, the table segmented into a plurality of banks, each bank associated with one of the plurality of hash values generated by the hashing module, and the table constructed so that the encoded values obtained from the input value encode an output value such that the output value cannot be recovered from any single encoded value.

34. The information retrieval architecture of claim 33 wherein the encoded values encode the output value such that the output value is recovered by combining the encoded values by performing a bit-wise XOR operation.

35. The information retrieval architecture of claim 33 wherein the table is stored in non-multi-ported memory.

36. A content-based information retrieval architecture comprising:
  a hashing unit that receives an input value and generates a plurality of hashed values from the input value;
  a memory unit that stores a table of encoded values, each hashed value generated from the input value corresponding to a location in the table of an encoded value; and
  a logic unit that recovers an output value from the encoded values, where the encoded values obtained from the input value encode the output value such that the output value cannot be recovered from any single encoded value, and where the hashing unit and the memory unit and the logic unit are pipelined into different stages.

37. The information retrieval architecture of claim 36 wherein the encoded values encode the output value such that the output value is recovered by combining the encoded values by performing a bit-wise XOR operation.

38. A content-based information retrieval architecture comprising:
  a filtering module that receives an input value and forwards the input value only if the input value is not a member of a filtered set of input values;
  a hashing module that receives the forwarded input value and generates a plurality of hashed values from the forwarded input value; and
  a table storing a plurality of encoded values, each hashed value generated from the forwarded input value corresponding to a location in the table of an encoded value, the table constructed so that the encoded values obtained from the forwarded input value encode an output value such that the output value cannot be recovered from any single encoded value.

39. The information retrieval architecture of claim 38 wherein the filtered set of input values are those input values that are not recognized as being members of a lookup set of input values with associated output values encoded in the table of encoded values.

40. The information retrieval architecture of claim 38 wherein the filtered set of input values are those input values selected so as to facilitate construction of the table of encoded values.

41. The information retrieval architecture of claim 40 wherein the filtered set of input values comprises at least one input value such that, when the hashing module generates a plurality of hashed values from the one input value, the hashed values generated from the one input value corre spond to not one singleton location in the table of encoded values.

42. The information retrieval architecture of claim 38 wherein at least one input value is remapped by the filtering module into another input value that is then forwarded to the hashing module.

* * * * *